United States Patent [19]

Takase et al.

[11] Patent Number: 4,842,814
[45] Date of Patent: Jun. 27, 1989

[54] NUCLEAR REACTOR FUEL ASSEMBLY

[75] Inventors: Iwao Takase, Toukai; Masahisa Inagaki, Hitachi; Masayoshi Kanno, Kitaibaraki; Toshimi Yoshida, Mito; Jiro Kuniya, Hitachi; Isao Masaoka, Hitachi; Tetsuo Yasuda, Hitachi; Hajime Umehara; Hideo Maki, both of Katsuta, all of Japan

[73] Assignee: Hitachi, Ltd., Tokyo, Japan

[21] Appl. No.: 9,477

[22] Filed: Feb. 2, 1987

[30] Foreign Application Priority Data

Feb. 3, 1986 [JP] Japan .................................. 61-20128
Jun. 11, 1986 [JP] Japan ................................. 61-133686

[51] Int. Cl.$^4$ .............................................. G21C 3/34
[52] U.S. Cl. .................................... 376/438; 376/462; 420/422; 148/11.5 Q
[58] Field of Search ............... 376/438, 462, 463, 906; 148/11.5; 420/422

[56] References Cited

U.S. PATENT DOCUMENTS 3,121,034  2/1964  Anderko ............................ 148/11.5
4,212,686  7/1980  Lunde ................................ 420/422
4,664,727  5/1987  Inagaki .............................. 420/422

OTHER PUBLICATIONS

Cheng, et al., "Corrosion Performance of Some Zirconium Alloys Irradiated in the Steam Generating Heavy Water Reactor—Winfrith Proceeding on Environmental Degradation of Materials in Nuclear Power Systems—Water Reactors", Aug. 22-25, 1983, pp. 273-296.

Primary Examiner—Donald P. Walsh
Attorney, Agent, or Firm—Antonelli, Terry & Wands

[57] ABSTRACT

A channel box and/or a spacer of a fuel assembly is a welded construction and made of a Zr-Nb-Sn alloy comprising 0.5-2.2 wt % Nb, 0.5-1.5 wt % Sn contained so as to satisfy the relation of Sn(wt %) 22×Nb(wt %)—3.0, and balance Zr or a Zr-Nb-Sn-Mo alloy comprising 0.5-2.2 wt % Nb, 0.5-1.5 wt % Sn contained so as to satisfy the relation of Sn(wt %)≧2×Nb(wt %)—0.3, 0.1-0.8 wt % Mo, and balance Zr. The welded portion, its heat affected zone and the unwelded portion of the channel box and/or the spacer have substantially the whole equilibrium phase structure.

27 Claims, 9 Drawing Sheets

NUCLEAR REACTOR FUEL ASSEMBLY

BACKGROUND OF THE INVENTION

This invention relates to a fuel assembly for nuclear reactors, and more particularly, to a nuclear reactor fuel assembly in which a plurality of fuel rods are spaced from one another by a spacer and contained in a channel box.

A Zr-Nb alloy which is composed of 0.5–5 wt % Nb and balance Zr is known as material for parts of BWR and PWR and disclosed in Japanese Patent Laid-Open No. 47-42220 (1972). This Japanese Patent Laid-Open discloses that welds of the Zr-Nb alloy corrode in a high-temperature water to produce a white oxide film thereby to have an accelerated corrosivity, and that the Zr-Nb alloy forms a black oxide film when heated at a temperature of 450°–650° C. after welding thereby to have corrosion resistance.

On the other hand, it is reported that a Zr-Nb alloy including 2.5 wt % Nb produces a white corrosion under an environment of high-temperature and high-pressure water when subjected to heat treatment after welding. The information is disclosed in Proceedings of the International Symposium on Environmental Degradation of Materials in Nuclear Power Systems-Water Reactors, Myrtle Beach, S. C. Aug.22–25, 1983, pages 274–294.

The above-mentioned two prior arts disclose the contraries concerning the effect of the heat treatment for preventing a weld and its heat affected zone of the Zr-Nb alloy from producing white corrosion or white oxide film. Thus, any effective means for prevention of the white corrosion at the weld and the heat affected zone has not been established.

SUMMARY OF THE INVENTION

An object of the present invention is to provide a nuclear reactor fuel assembly in which any white corrosion does not almost occur at a weld and its heat affected zone under an environment of high-temperature and high-pressure water.

The present invention resides in a nuclear reactor fuel assembly characterised in that a channel box and/or a fuel rod spacer constructed by welding is made of Zr-Nb-Sn alloy comprising 0.5–2.2 wt % Nb, 0.5–1.5 wt % Sn, the Nb and Sn being contained so as to satisfy the relation of Sn(wt %)≧2×Nb(wt %)-3.0 and balance Zr, and a weld and its heat affected zone are constituted of a crystal structure of only an equilibrium phase or a crystal structure having 85% (area ratio) of an equilibrium phase and a residual nonequilibrium phase, and an unwelded portion has an equilibrium phase structure.

Further, the present invention is characterized in that a channel box and/or a fuel rod spacer constructed by welding is made of Zr-Nb-Sn-Mo alloy comprising 0.5–2.2 wt % Nb, 0.5–1.5 wt % Sn, the Nb and Sn being contained so as to satisfy the relation of Sn (wt %)≧2×Nb (wt %)-3.0, 0.1–0.8 wt % Mo and balance Zr, a weld and its heat affected zone of the channel box and/or the spacer has a crystal structure of only an equilibrium phase or a crystal structure more than 85% (area ratio) of an equilibrium phase and the residual nonequilibrium phase, and an unwelded portion has an equilibrium phase structure.

A total amount of Mo (wt %) and Nb (wt %) is preferably at least 1.5 wt %, whereby the channel box or the spacer has the tensile strength of 70 kg/mm² or more and the thickness of the channel box or the spacer can be made thin to decrease the weight of the fuel assembly.

The present invention is based on a result of investigation that the reason why the occurrence of white corrosion in a weld and its heat affected zone of parts of a nuclear reactor which are made of a Zr-Nb binary alloy is because a nonequilibrium phase appears in a crystal structure.

An equilibrium phase in an equilibrium diagram of a Zr-Nb binary alloy comprises a hexagonal αZr phase in which about 1 wt % of Nb is contained in a state of solid solution and a βNb phase in which 15 wt % of Zr is contained in a state of solid solution. According to increase or decrease in an amount of Nb, a ratio of αZr/βNb changes.

On the other hand, when the Zr-Nb binary alloy having such an equilibrium phase structure is welded, a nonequilibrium phase which does not appear in the equilibrium diagram occurs during cooling after the welding. The equilibrium phase is grown up in a needle shape, the amount of which is much more than 50% by area ratio.

The inventors confirmed that the white corrosion occurs in a needle-shaped nonequilibrium phase under an environment of high-temperature and high-pressure water, and develops therefrom.

Based on the above, the present invention makes it difficut for white corrosion to occur by causing a nonequilibrium phase appeared in a weld and its heat affected zone to disappear or by reducing a rate of the nonequilibrium phase to be very small.

The weld and its heat affected zone can be made highly corrosion resistant by providing a weld and its heat affected zone of only an equilibrium phase structure or substantially the whole equilibrium phase structure which consists of small part of a nonequilibrium structure and most part of a equilibrium phase structure, whereby the occurrence of white corrosion can be prevented or reduced remarkably.

A rate of a nonequilibrium phase to be allowed to coexist with an equilibrium phase in a weld and its heat affected zone should be less than 15% by area ratio, and the less, the better. It is confirmed that when the area ratio of nonequilibrium phase is less than 15%, no white corrosion occurs, or even if occur there is no problem in practice.

A nonequilibrium phase has a complicated structure which comprises a Zr phase containing Nb in a super-saturated state as a solid solution, and a martensite phase called α' phase, and appears in a needle shape. It is confirmed that in a ternary alloy having Sn contained in a Zr-Nb binary alloy in a suitable range or in a quaternary alloy having Sn and Mo contained in the Zr-Nb binary alloy in a suitable range, a nonequilibrium phase can be caused to disappear or reduced to a very small amount by subjecting it to heat treatment after welding, namely the nonequilibrium phase can be controlled to be less than 15% by area ratio. As the heat treatment, aging treatment is preferable.

The present invention resides in that a weld or welded area and its heat affected zone are constituted of only an equilibrium phase structure, or a structure consisting of more than 85% by area ratio of an equilibrium phase and the residual, less than 15%, of a nonequilibrium phase. The structure that more than 85% of an equilibrium phase and less than 15% of a nonequilibrium phase exist mixedly is called substantially the whole equilibrium phase structure here.

An unwelded area which is not a weld and not influenced with welding has only an equilibrium phase structure or turns into a recrystallized structure of a granular equilibrium phase by effecting aging treatment after welding.

DETAILED DESCRIPTION OF THE INVENTION

Figure 1:
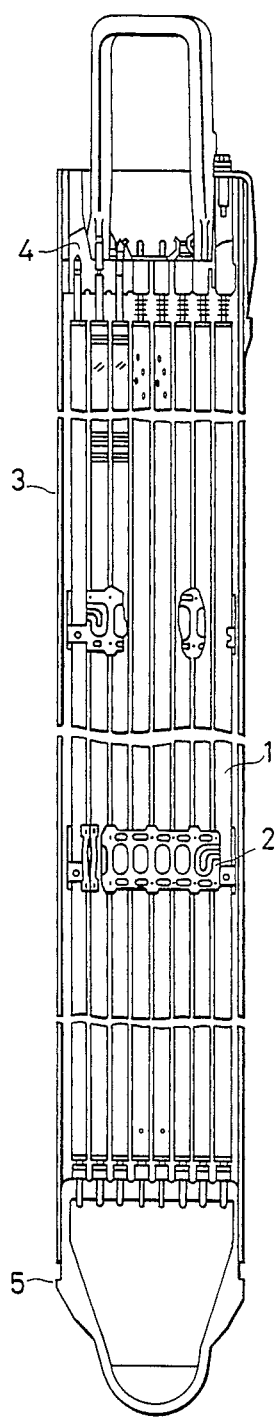
FIG. 1 is a sectional view of a nuclear reactor fuel assembly.

A nuclear reactor fuel assembly will be described hereunder in detail, referring to the drawings.

In FIG. 1, a fuel assembly for BWR comprises a plurality of fuel rods 1 each including a cladding and fuel pellets contained therein, spacers 2 each arranged in longitudinal direction with a distance so as to keep the fuel rods 1 spaced from one another, a square channel box 3 for containing therein the fuel rods 1 bundled by the spacers 2, upper and lower tie plates 4, 5 supporting the fuel rods 1 at both ends thereof, and a handle for transporting the fuel assembly.

The fuel assembly is produced through various production steps. Each part of the fuel assembly has welding portions.

Figure 2A:
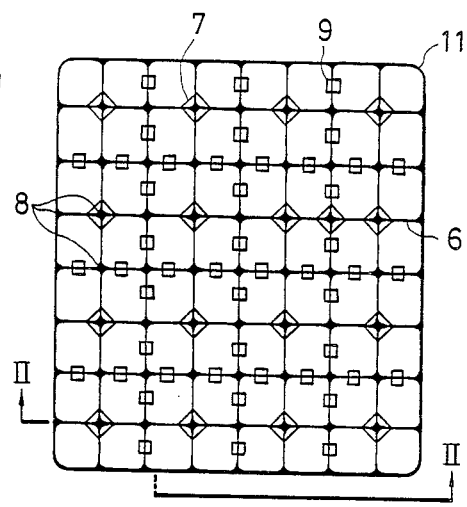
FIG. 2(A) is a plane view of a spacer.
Figure 2B:
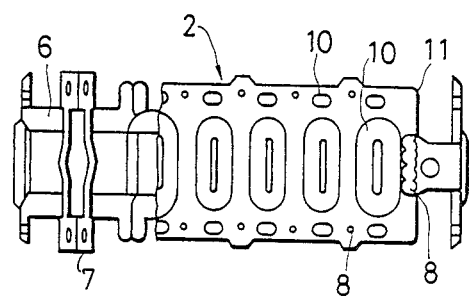
FIG. 2(B) is a sectional view of the spacer of FIG. 2(A) viewed from line II—II.

The spacers 2 each are of a lattice or grid like frame as shown in FIGS. 2(A) and 2(B). The spacer 2 comprises spacer bars 6 arranged in lattice, spacer leaf springs 7 mounted on the latticed spacer bars 6, spacer dividers 9 formed in the latticed spacer bars 6, and a spacer band 11 surrounding and secured to the latticed spacer bars 6. The spacer band 11 comprises 4 segments each having dimples 10 formed by press working, and joined together by welding. The spacer band 11 and the latticed spacer bars 6 also are joined by welding. Thus, the spacer 2 has welds or welded portions 8. The spacer 2 thus formed has a plurality of spaces in which fuel rods are inserted and supported by the spacer leaf springs 7. Lateral vibration and bending in a longitudinal direction, of the fuel rods 1 are prevented. The spacer 2 is used, in a state that stresses are applied by the fuel rods 1, and in contact with reactor water.

Figure 3:
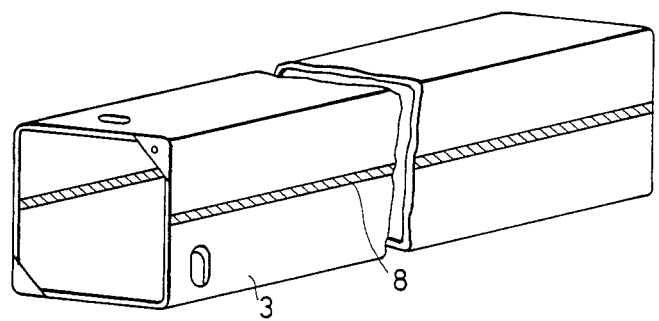
FIG. 3 is a perspective view of a channel box.

The channel box 6 comprises two segments, each of which has the same shape as a half of the channel box divided into two in a longitudinal direction, as shown in FIG. 3. The segments are made of plate material through blanking, bending, and joined together by welding to be the square channel box 6 with welds 8 extending in the longitudinal direction. The channel box 6 serves to excel high-temperature water and vapor generated by the fuel rods 1 during the operation of a power plant to flow into upper portions, and it is used for a long time in a state that stresses directed toward the outside are always applied on the channel box 6.

In a BWR, high-temperature and high-pressure water reaches to 288° C., 85 Kg/cm$^2$, for example, while in PWR, higher than in the BWR. Accordingly, for material for the fuel cladding, the spacer 2 and the channel box 6 of the fuel assembly, it is desired to have corrosion resistance and unbrittleness under the environment of such high-temperature and high-pressure water. Further, it is necessary to be strong in tensile strength.

Zirconium-base alloys, generally, have a high corrosion resistance and small neutron absorption cross-section. These properties of the alloys are suitable as material for the nuclear reactor fuel assembly, and used in the fuel cladding, the channel box and the spacers. Of these Zr-base alloys used in the fuel assembly, there are the following alloys, that is, Zircalloy-2, Zircalloy-4, Zr-1 wt % Nb alloy, Zr-2.5 wt % Nb alloy, Zr-3.5 wt % Sn-0.8 wt % Nb-0.8 wt % Mo alloy (Excel alloy), and Zr-1 wt % Sn-1 wt % Nb-0.5 wt % Fe alloy, Zr-Nb(0.5-5.0 wt %)-Sn(0-3.0 wt %)-one metal (-2 wt %) of Fe, Ni, Cr, Ta, Pd, Mo, and W alloy.

When Zr-Sn-Fe-Cr-(Ni) alloy called Zircalloy is used in a BWR for a long time, partial or local oxidation (nodular corrosion) occurs. The occurrence of the nodular corrosion reduces thickness in a sound portion of the alloy member, and further results in lowering the strength of the alloy member because hydrogen generated in the corrosion reaction are absorbed, and brittle hydrides are formed in the alloy member. The corrosion phenomenon progresses according to the lapsed time, so that it is thought in general that corrosion of a member becomes a factor determining the life of a fuel assembly, when the member is used for a long time under a high exposure condition.

Zr-Nb alloy is known as a material to be high in tensile strength, excellent in creep strength and low in hydrogen pick-up fraction. No nodular corrosion occurs. These are preferable properties as material for fuel assembly members, however, there is left such a problem that white accelerated corrosion occurs in a weld and its heat affected zone.

U.S. Pat. No. 3,121,034 disclosed that high corrosion resistance of a Zr-base alloy (Zr-0.5-5 wt % Nb), ternary alloy (Zr-0.5-5 wt %Nb-0-3 wt %Sn), or quaternary alloy (Zr—0.5-5 wt %Nb—0-3 wt %Sn—any one element (0-2 wt %) of Fe, Ni, Cr, Ta, Pd, Mo and W) is improved by annealing of 550-600° C., 1-240 hrs, after cold rolling (reduction rate: 50-60%). However, the U.S. patent is silent on corrosion of a weld or welded portion. For a welded member, it is difficult to effect reduction of several tens % on the welded area after welding.

Any concrete data presented in Examples in the U.S. patent do not show such a chemical content range of a Zr-base alloy member as specified in the present invention. Further, it would not be forecast from the disclosure of the U.S. patent to determine the specific chemical content range as in the present invention in order to enhance corrosion resistance of a weld and its heat affected zone of a Zr-base alloy member suitable for parts of a fuel assembly.

EFFECT OF ADDITION OF NB

Figure 4:
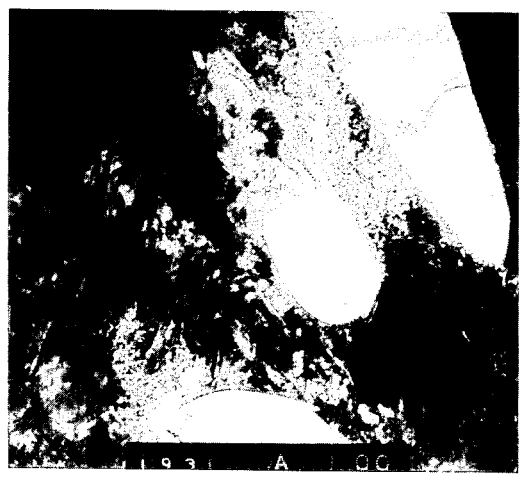
FIG. 4 is a photograph showing a metallurgical structure of a Zr-Nb binary alloy.
Figure 5:
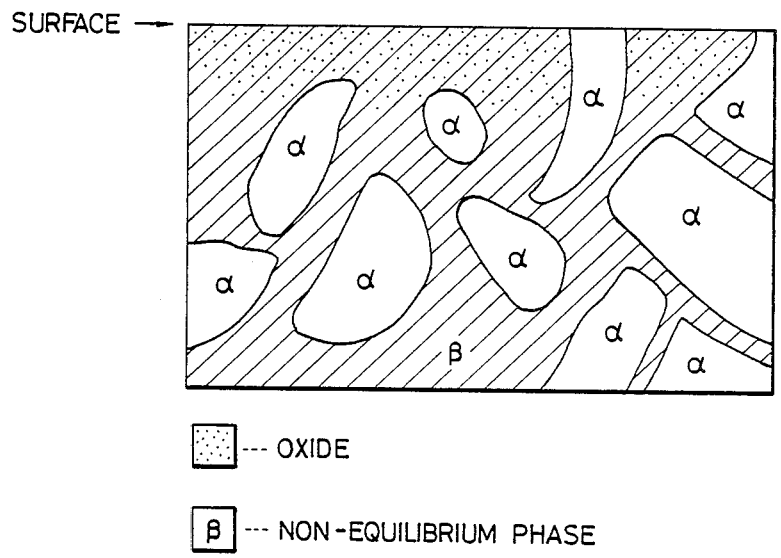
FIG. 5 is a typical illustration showing a relationship between corrosion resistance and a metallurgical structure.

In a metal equilibrium diagram of Zr-Nb binary alloys, an equilibrium phase at a room temperature comprises a hexagonal $\alpha Zr$ phase containing about 1 wt % of Nb in a state of solid solution and a Nb phase containing less than 15 wt % of Zr in a state of solid solution. A welded area and a heat affected zone surrouding the welded area are cooled rapidly from a high temperature, so that a nonequilibrium phase which does not appear in the equilibrium phase diagram occurs. FIG. 4 shows a metallurgical structure of a Zr-2.5 wt % Nb alloy which is cooled at a cooling rate of 100° C./s from a temperature of 830° C ($\alpha + \beta$ phase temperature range). White portions in FIG. 4 is an $\alpha Zr$ phase containing about 1.5 wt % of Nb in a state of solid solution. A needle like structure surrounding the $\alpha Zr$ phase is resulted from rapidly cooling from a $\beta$ phase temperature, and it is a complicated metallic structure comprising a residual $\beta$ phase containing about 3.5 wt % Nb in a state of solid solution and a nonequilibrium phase called an $\omega$ phase or martensite ($\alpha'$phase). A welded area and its heat affected zone surrounding the welded area present a similar metallic structure of a nonequilibrium. Namely, an area heated to a temperature in a $\beta$ phase temperature range above 862° C. has a needle like structure, and an area heated in a temperature range in which $\alpha$ and $\beta$ phases exist mixedly has a mixture of $\alpha Zr$ phase crystal grains similar to the metallic structure in FIG. 4 and a needle-shaped sructure. As a heating temperture rises, a needle-shaped structure portion increases. When heating temperature reaches the $\beta$ phase temperature range, any Zr phase can not be observed and all the structure turns into a needle-shaped structure. FIG. 5 is a typical illustration showing a relationship between corrosion resistance and a metallurgical structure. When an alloy having such a metallurgical structure as shown in FIG. 4 is exposed to high temperature water, oxidation of a needle-shaped structure of a nonequilibrium phase is selectively accelerated, and a porous, white, thick, oxide film is formed.

On the other hand, corrosion resistance of a $\alpha Zr$ phase portion containing about 1.5 wt % Nb in a state of solid solution is very high. In a welded area and its heat affected zone of a Zr-Nb alloy containing more than 1.5 wt % Nb, the above-mentioned accelerated white corrosion occurs.

Figure 6:
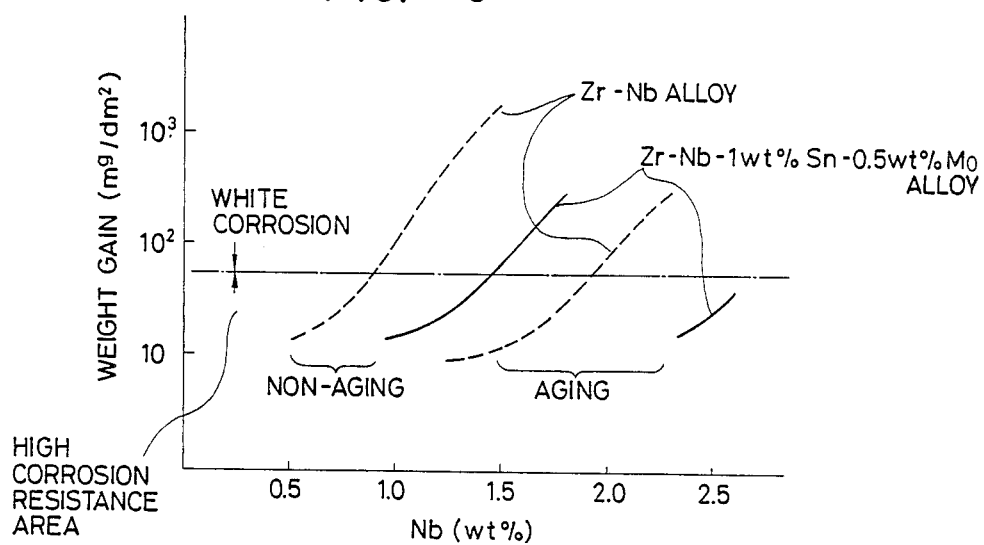
FIG. 6 is a graph showing relationships between weight gain and an amount of addition of Nb of Zr-Nb alloy and Zr-Nb-1 wt % Sn-0.5 wt % Mo alloy which were corrosion tested in a high-temperature water of 288° C., 85 kg/cm$^2$ for 670 hrs.

In Zr-Nb alloys, Nb has an effect of depressing the occurrence of nodular corrosion and an effect of enhancement of strength with fine precipitation of $\beta Nb$ phase by aging. As shown in FIG. 6, a material which is not subjected to aging has a remarkably high sensitivity to white corrosion. In a Zr-Nb binary alloy, white corrosion occurs by addition of 1.5 wt % Nb, the white corrosion further develops by adding Nb more.

In a Zr-Nb-Sn-Mo quaternary alloy, an addition of at most 1.0 wt % Nb does not cause white corrosion to occur, but when a lot of Nb more than that is added, white corrosion occurs. The reason why as Nb content increases, the occurrence of corrosion gets easier, is that a $\alpha'Zr$ phase or $\beta Zr$ phase of nonequilibrium phase is easily formed in the welded area and its heat affected zone. On the contrary, the quaternary alloy according to the present invention is high in corrosion resistance and strength because an amount of Nb contained in a nonequilibrium phase in a state of solid solution decreases by promoting precipitation of $\beta$-Nb due to addition of Sn and precipitating intermetallic compounds such as Mo-Nb. By subjecting the alloy to aging treatment, corrosion resistance increases, and even in a Zr-Nb binary alloy, white corrosion does not occur by adding about 1.5 wt % of Nb. The addition of about 2.0 wt % of Nb causes white corosion. In the Zr-Nb-Sn-Mo quaternary alloy, even when 2.5 wt % of Nb is added, white corrosion is not observed, and it is noted that the alloy is excellent in corrosion resistance. When the upper limit of a Nb amount to be added is 2.2 wt %, an effect of Nb can be exhibited in all chemical content range in Zr- Nb-Sn ternary alloys and Zr-Nb-Sn-Mo quaternary alloys.

EFFECT OF ADDITION OF SN

Figure 7:
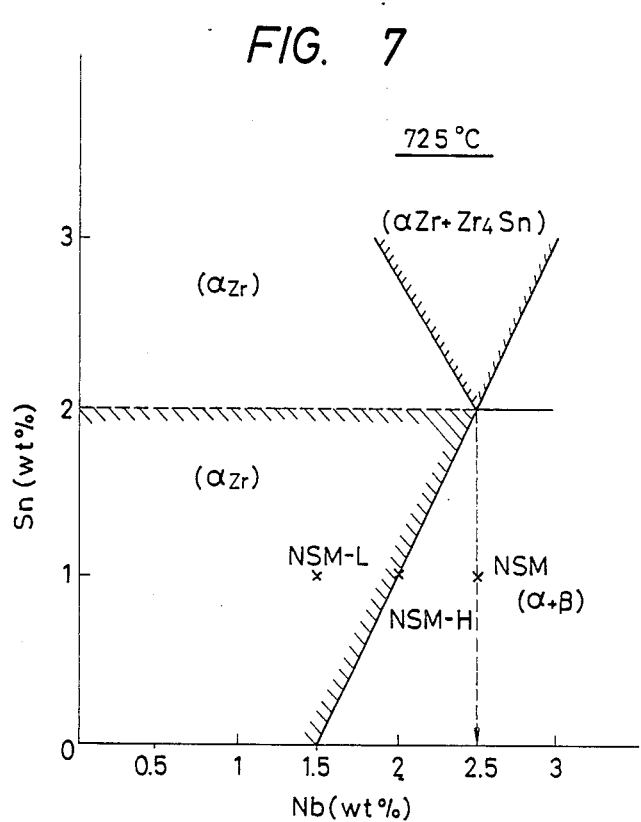
FIG. 7 is an equilibrium diagram of Zr-Nb-Sn ternary alloy.

A nonequilibrium phase having a needle-like metallurgical structure is resulted by rapidly cooling from a $\beta$ phase produced at a high temperature. The addition of Sn increases an amount of Nb contained in an $\alpha Zr$ phase in a state of solid solution and decreases an amount of Nb contained in a $\beta Zr$ phase, whereby a nonequilibrium phase is difficult to occur during cooling after welding. In this manner, by making the nonequilibrium phase difficult to occur in a process of welding and then subjecting it to aging treatment, the nonequilibrium phase can be caused to disappear from the welded area and its heat affected zone reduced remarkably in its amount. FIG. 7 shows an equilibrium diagram of Zr-Nb-Sn ternary alloys at a temperature of 725° C. It is noted from FIG. 7 that a maximum amount of Nb contained in a $\alpha Zr$ phase in a state of solid solution is about 1.5 wt % when Sn is not added, while an amount of Nb contained in the $\alpha Zr$ phase in a state of solid solution increases to 2.5 wt % at the maximum when an amount of Sn contained therein increases up to 2 wt %. However, when more than 2 wt % of Sn is added, $Z_{r4}$ Sn precipitates, and Sn does not contribute to increase an amount of Nb contained in $\alpha Zr$ phase in a state of solid solution. In order to maintain an excellent corrosion resistance, there is a proper correlation between Sn and Nb added, and the correlation should be satisfied. The proper range of contents of Sn and Nb is within an area (less than Sn 2 wt %) shown by hatching in FIG. 7 and the correlation is given by Sn(wt %)$\geq 2 \times$Nb(wt %)—3.0. By effecting after welding, heat treatment of Zr-Nb-Sn ternary alloy and a Zr-Nb-Sn-Mo quaternary alloy which satisfy the above-metioned correlation, a nonequilibrium phase can be caused to disappear or to be reduced remarkably.

The heat treatment is most favorable to be effected under the following conditions:

Namely, it is necessary to maintain the alloy for at least 2 seconds in a temperature range of 680° to 780° in which a larger amount of Nb can be contained in an $\alpha Zr$ phase in a state of solid solution, and it is preferable to cool continuously it from a temperature range of $\alpha + \beta$ phase and to control a cooling rate to be more than 2 sec. of a cooling period of time from 780° C. to 680° C., that is, less than about 50° C./sec.

An effect of the addition of Sn is that an amount of Nb contained in a β phase in a state of solid solution is reduced by increasing an amount of Nb contained in a high-temperature αZr phase, and that generation of a residual β phase, a ω phase and a martensite (α' phase) is depressed in a welding process. The maximum addition amount of Sn is 2 wt % preferably 1.5 wt %. The addition of more than 2 wt % reduces the effect. As a temperature lowers, solid solubility of Nb in an αZr phase decreases so that a βNb precipitates in a αZr phase crystal grain and on a grain boundary, and the αZr phase turns into a metallurgical structure comprising an αZr phase containing about 1.5 wt % Nb in a state of solid solution and fine βNb precipitates. Since an amount of Nb contained in a β phase in a state of solid solution is small, a nonequilibrium phase is difficult to occur even in a needle-shaped structure.

EFFECT OF ADDITION OF MO

A solid solubility of Mo in an αZr phase is negligibly small. Therefore, Mo finely precipitates as intermetallic compounds of Mo2Zr of body-centered cubic crystal. The addition of Mo has an effect of raising resistance against deformation of an alloy and enhancing strength by uniformly dispersing fine precipitations within a crystal grain and on the grain boundary. Even if Nb which influences badly on corrosion resistance is reduced in amount, the strength is maintained by adding Mo together with it. The addition of Nb causes the βNb phase to finely prcipitate thereby increasing the strength, and the addition of Mo also increases the strength by finely precipitating Mo2Zr. In order to obtain an effect of strength enhancement of an alloy due to the precipitation, it is necessary for addition of both Mo and Nb to satisfying the following: Nb+Mo 1.5 wt %.

EFFECT OF STRUCTURE IMPROVEMENT BY AGING TREATMENT

The occurrence of nonequilibrium phase by adding Sn is suppressed. However, the nonequilibrium phase is sometimes left under welding conditions of a large cooling rate. In this case, by effecting aging treatment in a temperature range of less than 610° C., the nonequilibrium phase is decomposed into an αZr phase which is stable in this temperature range, a βNb phase and an intermetallic compound Mo2Zr phase, and turns into a metallic structure of a welded area and its heat affected zone in which the nonequilibrium phase is not left substantially. An aging heat treatment after welding improves the corrosion resistance of the welded area and the heat affected zone even if an amount of addition of Nb is increased by about 0.5 wt % over the upper limit of an amount of Nb contained in the αZr phase in a state of solid solution.

Embodiments of the present invention will be described hereunder in detail according to the following examples.

EXAMPLE I

Figure 8:
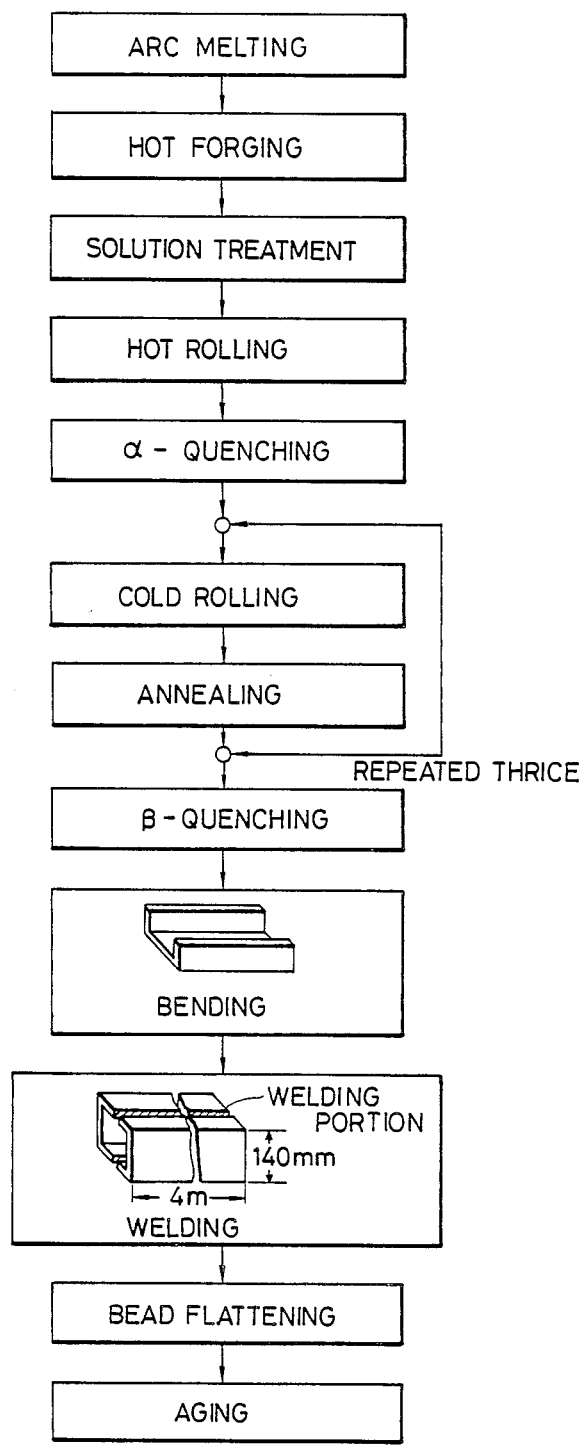
FIG. 8 is a flow chart of a channel box production process of Example I.

Table 1 shows chemical compositions of alloys. An ingot prepared by arc melting was subjected to forging and solution treatment at 1000° C., then hot rolling of 600°-650° C. was repeatedly carried out to produce a plate having a thickness of 10 mm. The plate was further subjected to solution treatment of 980° C. and then three times to a cycle comprising cold rolling (thickness reduction rate 40%) and annealing of 650° C. and 2-3 hr., whereby a plate having a thickness of 2.2 mm was produced. The plate was heated at 830° C. for 1h, and then cooled at an average cooling rate of 50° C./s to a room temperature. The plate was bent into a shape like a square bracket and then joined by Tig welding to form a channel box as shown in FIG. 3. Cold reduction was carried out to flatten beads after welding. Then, aging was carried out in a vacuum or Ar gas atmosphere at 500° C. for 24h. The above-mentioned process is shown in FIG. 8.

The process may include α-quenching step after the hot rolling. In the step, the plate is heated to about 725° C. to include Nb in a α phase in a state of solid solution and then rapidly cooled.

Test samples including welded areas were cut off from the channel box right after the Tig welding step and the channel box right after the aging step to subject to metallurgical structure observation and corrosion test.

TABLE 1

| Alloy Name | Composition of alloy (wt %) | | | |
|---|---|---|---|---|
| | SN | Nb | Mo | Zr |
| NSM—L | 1.0 | 1.5 | 0.5 | bal. |
| NSM—H | 1.0 | 2.0 | 0.2 | " |
| NSM | 1.0 | 2.5 | 0.2 | " |
| Zr—2.5 Nb | — | 2.6 | — | " |

Table 2 shows metallurgical structures of welded areas of alloys. In NSM-L alloys, both of the sample subjected to welding without aging and the sample subjected to aging after welding do not contain nonequilibrium phases. The NSM-H alloy which was welded included α'Zr phase (nonequilibrium phase) without aging after welding, but the nonequilibrium phase disappeared by aging after welding. The NSM alloy had nonequilibrium phase left in any of the sample welded without aging and the sample subjected to welding and aging. Zr-2.5Nb alloy not containing Sn had a larger amount of nonequilibrium phase reduced therein than in NSM alloy. The nonequilibrium phase did not disappear even by subjecting the alloy to aging.

TABLE 2

| Name of alloy | Metallurgical structure |
|---|---|
| NSM—L (Welded) | αZr phase, βNb phase, Mo2Zr |
| NSM—L (Welded-Aging) | " |
| NSM—H (Welded) | αZr phase, βNb phase, Mo2Zr, Martensite (α'Zr phase) |
| NSM—H (Welded-Aging) | αZr phase, βNb phase, Mo2Zr |
| NSM (Welded) | αZr phase, βNb phase, ωZr phase, βZr phase, MO2Zr |
| NSM (Welded-Aging) | αZr phase, βNb phase, ωZr phase, Mo2Zr |
| Zr—2.5 Nb (Welded) | αZr phase, βNb phase, ωZr phase, βZr phase, Martensite (α'Zr phase) |
| Z—2.5 Nb (Welded-Aging) | " |

Table 3 shows the results of corrosion tests in which each test sample was kept in high-temperature water of 288° C. for 300 hours. An amount of oxygen dissolved in the high-temperature water was 5-8 ppm and the high-temperature water was recirculated in an autoclave at a flow rate of 10 l/h.

In NSM-L alloy, a black thin oxide film was formed both in a welded area and in its heat affected zone, an excellent corrosion resistance was exhibited. In NSM-H alloy, a gray, unbrilliant oxide film was formed in a welded area of a welded sample and its corrosion resistance was a little lowered. However, the corrosion resistance was improved by effecting the aging treatment. Corrosion resistance of MSM alloy and Zn-2.5Nb alloy was low and was not improved by aging. NSM alloy has corrosion restance superior to that of Zr-2.5Nb alloy, which is based on an effect of addition of Sn. It was found that both of NSM-H alloy and NSM-L alloy had substantially the same tensile strength as Zn-2.5Nb alloy and were excellent in the strength and the corrosion resistance.

TABLE 3

| Name of alloy | Weld | Heat affected zone |
|---|---|---|
| NSM—L (Welded) | 0 | 0 |
| NSM—L (Welded-Aging) | 0 | 0 |
| NSM—H (Welded) | 0 | Δ |
| NSM—H (Welded-Aging) | 0 | 0 |
| NSM (Welded) | X | X |
| NSM (Welded-Aging) | 0 | Δ |
| Zr—2.5 Nb (Welded) | X | X |
| Zr—2.5 Nb (Welded-Aging) | X | X |

In Table 3, a mark O shows that a oxide film thickness is less than 1 μm and the color of the oxide film is brilliant and black. A mark Δ shows that an unbrilliant oxide film thickness is 1–3 μm. Corrosion resistance is a little low. A mark X shows that a white porous oxide film is formed, the thickness is more than 4 μm. The corrosion resistance is low.

EXAMPLE II

Figure 9:
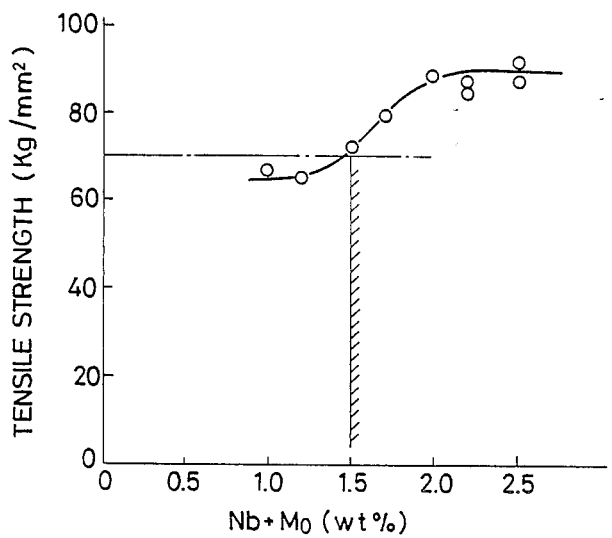
FIG. 9 is a characteristic chart showing a relationship between tensile strength and Nb+Mo in Example II.

FIG. 9 shows a relationship between tensile strength of Zr-Nb-Sn (about 1 wt %)-Mo (about 0.5 wt %) alloy and an amount of addition of Mo. Various arc-melting ingots each were forged at a βphase temperature, subjected to solution treatment of 1000° C., and then rolled twice at 700° C. to produce a plate having a thickness of 10 mm. The plate was subjected twice to a cycle of cold rolling and annealing of 600° C. thereby forming a 3 mm thick plate. The plate was heated to 880° C. to keep heating for 1 hour and then cooled with water. After descaling, again the cold rolling was carried out to reduce the thickness to 2.2 mm. The plate was bent into a shape of a half of a channel box divided into two, and then joined by plasma welding to form a square channel box. After welding, the channel box was subjected to aging treatment of 500° C. and 24 hr.

Then, test pieces for tensile strength test were cut off from the channel box to be supplied for a test. As a result of the test, it was found that the tensile strength of the alloy becomes higher as an amount of addition of Nb+Mo increases, and the tensile strength of test pieces having more than 1.5 wt % of Nb+Mo added became more than 70 kg/mm$^2$.

EXAMPLE III

Alloys listed in Table 4 were prepared by using industrially pure Zr through melting. The melting was effected in a vacuum arc melting furnace. Each sample was subjected to solution heat treatment at 1000° C. and then repeatedly to a cycle of hot plastic deformation at 750° C., cold rolling and annealing of 650° C. to produce a thin plate having a thickness of 2 mm. Next, the thin plate was subjected to solution treatment of 880° C. 1 hour, cold reduction of 10%, welding and, finally, ageing treatment of 500° C. 24 hour.

Corrosion test pieces were taken from welded joint material, and nodular corrosion sensibility and white corrosion sensibility were evaluated through a test in high-temperature steam and through a corrosion test in high-temperature water, respectively. In the corrosion test in high-temperature steam, the test sample was kept in a supersaturated steam of 510° C., 105 kg/cm$^2$ for 20 h. In the high-temperature corrosion test, the test sample was kept in a high-temperature water of 288° C., 85 kg/cm$^2$ for about 300 h. Corrosion resistance was evaluated by observing its appearance measuring weight gain due to corosion and oxide film thickness. As the result of the corrosion tests, both of nodular corrosion and white corrosion did not occur in the material of the present invention, as shown in Table 4, so that it is noted that it has an excellent corrosion resistance.

A test sample (final step is welding) which was subjected to ageing heat treatment and then to welding, also was evaluated about corrosion resistance in the similar manner. As the result, in the test sample the final production step of which was welding, white corrosion occured remarkably in a conventional Zr-2.5 wt % Nb alloy, and powdery oxide was produced. In the alloy of the present invention, white corrosion was observed but it was very small. The alloy has a great corrosion resistance.

The addition of Fe (0.04–1.0 wt %) is effective in modifying oxide film in corrosion of Zr-base alloy. The NSM-6 alloy is low in level of the thickness of the oxide film.

TABLE 4

| | Sample No. | Chemical composition (wt %) | | | | | | | Anticorrosion evaluation test result | | Tensile strength (kg/mm$^2$) |
| | | Nb | Sn | Mo | Fe | Cr | Ni | Zr | *Nodular corrosion | **White corrosion | |
|---|---|---|---|---|---|---|---|---|---|---|---|
| This invention alloy | NSM—1 | 1.55 | 1.15 | 0.30 | — | — | — | Bal. | non | non | 71 |
| | NSM—2 | 1.90 | 1.20 | 0.34 | — | — | — | " | " | " | 75 |
| | NSM—3 | 1.17 | 0.98 | 0.18 | — | — | — | " | " | " | 70 |
| | NSM—4 | 1.42 | 0.90 | 0.47 | — | — | — | " | " | " | 85 |
| | NSM—5 | 2.00 | 1.00 | 0.20 | — | — | — | " | " | " | 80 |
| | NSM—6 | 1.58 | 1.02 | 0.23 | 0.05 | — | — | " | " | " | 70 |
| Comparative alloy | NZ—1 | 0.92 | | | | | | " | " | " | 58 |
| | NZ—2 | 2.33 | | | | | | " | " | Corrosion | 80 |
| | NZ—3 | 2.60 | | | | | | " | " | " | 85 |
| | Zircalloy-2 | — | 1.52 | — | 0.14 | 0.1 | 0.05 | " | Corrosion | non | 54 |

TABLE 4-continued

| Sample No. | Chemical composition (wt %) | | | | | | Anticorrosion evaluation test result | | Tensile strength (kg/mm²) |
| | Nb | Sn | Mo | Fe | Cr | Ni | Zr | *Nodular corrosion | **White corrosion | |
| --- | --- | --- | --- | --- | --- | --- | --- | --- | --- | --- |
| Zircalloy-4 | — | 1.50 | — | 0.14 | 0.10 | — | " | " | " | 54 |

*In steam of 510° C., 105 kg/cm² for 20 h.
**In water of 288° C., 85 kg/cm² for 300 h.

EXAMPLE IV

Figure 10:
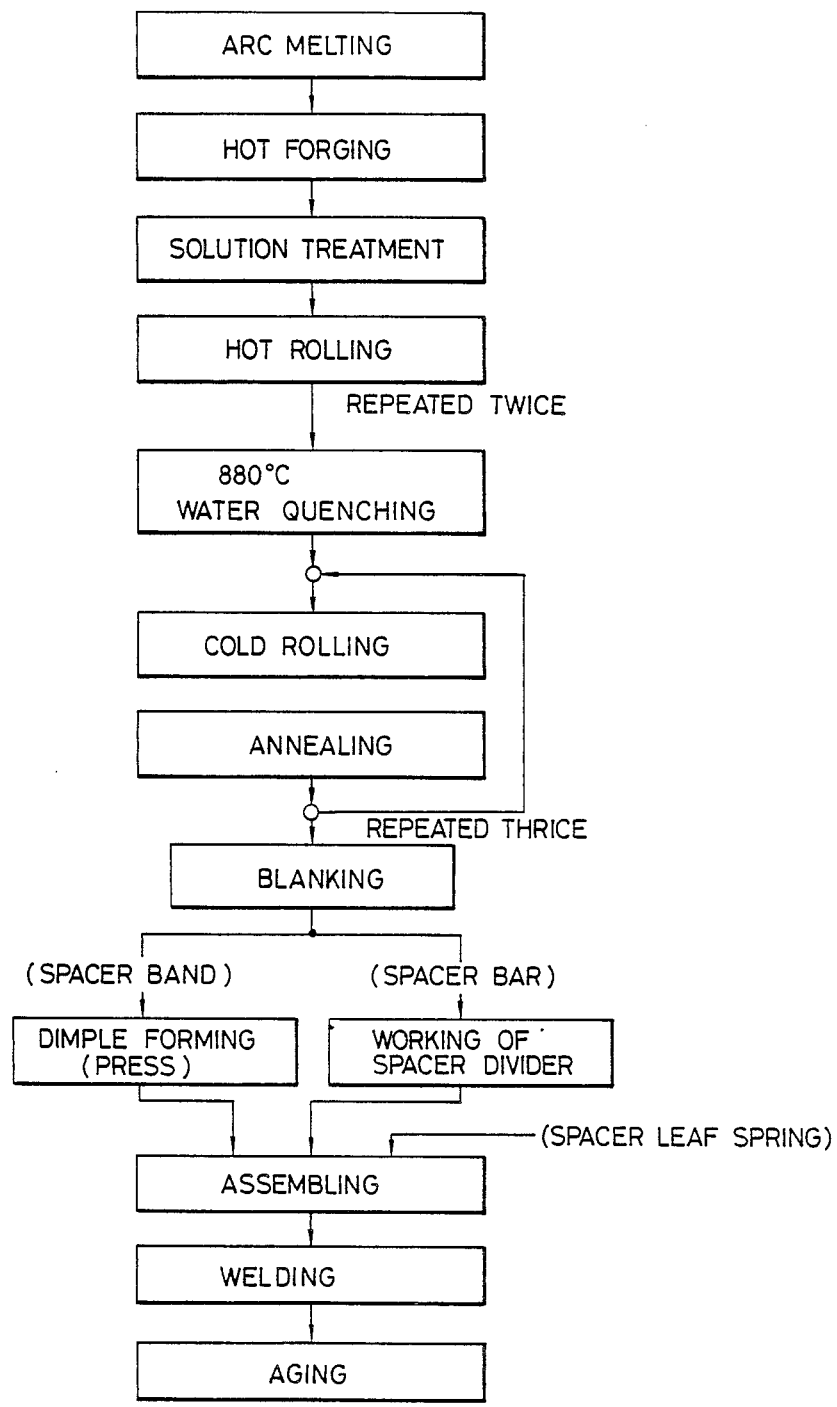
FIG. 10 is a flow chart of a spacer production process of Example IV.

The spacer is shown in FIG. 2(A) and 2(B) and its production process is shown in FIG. 10. As mentioned already, the spacer comprises spacer bands 11, grid or lattice like spacer bars 6, a spacer dividers 9, and spacer leaf springs 7, latticed points and abutments between the spacer bars 6 and the spacer bands 11 are joined by spot welding.

Figure 11A:
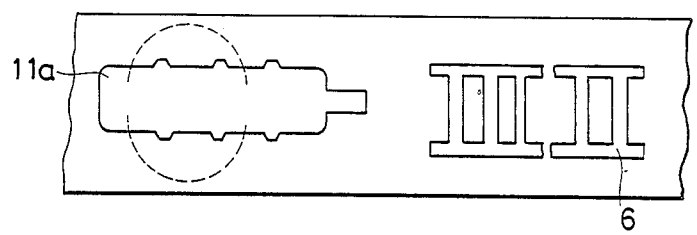
FIG. 11(a) is a plane view of a blanked plate.
Figures 11B, 11C, 11D:
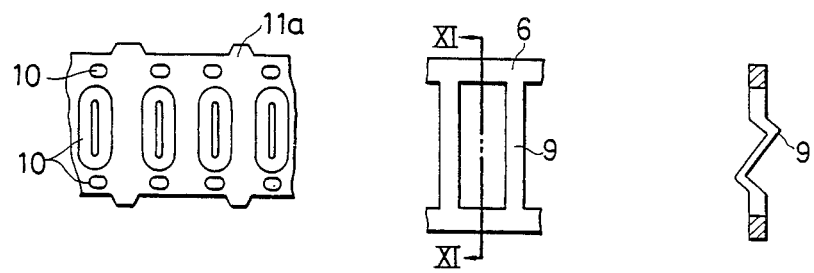
FIG. 11(b) is a partial plane view of a spacer band in FIG. 11(a)
FIG. 11(c) is a partial plane view of a spacer bar.
FIG. 11(d) is a sectional view of the spacer bar taken along a line XI—XI.

As material, a forging alloy (100 mm thick) of the sample NSM-2 (1.9 wt % Nb, 1.20 wt % Sn, 0.34 wt % Mo and balance Zr) was subjected to solution treatment of 1000° C. and then twice to hot rolling whereby a 3.2 mm thick plate was made. This plate was heated at 880° C. for 1 hour and then subjected to water quenching. Cold rolling and intermediate annealing of 550° C.±40° C. were repeated to form a plate having a thickness of 0.7 mm, as shown in FIG. 11(a). From the plate, spacer band segments 11a as shown in FIGS. 11(a) and 11(b) and spacer bands 6 as shown in FIGS. 11(c) and 11(d) were blanked. The spacer band segments 11a were worked by a press to have dimples 10 and then bent. 4 of the spacer band segments 11a were assembled by welding to form a spacer band 11 as shown in FIG. 2(B). The spacer bars 6 also were worked by a press to form spacer dividers 9. The spacer band 11, the spacer bars and lantern leaf springs of inconel were assembled by Tig welding to form a spacer 2 as shown in FIG. 2(A). After assembled, the spacer was subjected to solution treatment of 500° C., 24 hours. The spacer was subjected to the same corrosion test as in Example III. Accelerated white corrosion did not occur. The spacer has a high corrosion resistance. An amount of hydrogen absorbed in the spacer material also was measured. Only less than about 8% of hydrogen generated according to the following reaction was absorbed:

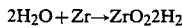

It was found that a hydrogen absorption rate was low.

Further, tensile strength test pieces including welds were cut off from the spacer made by the above-mentioned process, and the tensile strength was tested. The tensile strength was 75–80 kg/mm². It is noted from the results that this member has a higher strength than Zircalloy.

EXAMPLE V

Figure 12A:
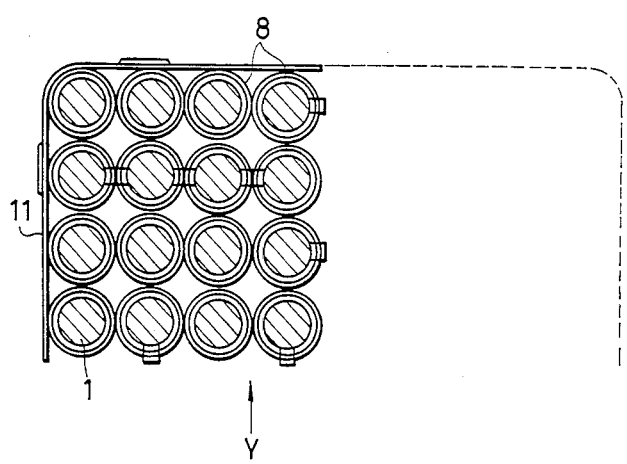
FIG. 12(a) is a place view of around cell type spacer.
Figure 12B:
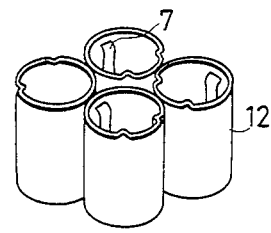
FIG. 12(b) is a perspective view of round cells.

FIG. 12(a) shows a round cell type spacer. The spacer has a plurality of round cells 12 for supporting fuel rods. The cells 12 are welded to one another and also to a spacer band 11, by spot welding.

As material of this spacer, Zr-1.4 wt % Nb-1 wt % Sn-0.3 wt % Mo alloy were used. A thin plate which is for the spacer band 11 and 0.7 mm thick was manufactured through hot forging, solution treatment, hot rolling (twice) and repetition of cold rolling and annealing. Then, blanking and dimple formation were carried out to form a predetermined shape. A thin welded tube for the round cells 12 was made through forging of an ingot, solution treatment, hot extrusion, and repetition of cold rolling and annealing. The thin walled tube was cut in a predetermined scale, and the cut tube had a leaf spring fixed, whereby a round cell was formed. The cells were assembled into the spacer band by Tig welding. After assembled, the spacer was subjected to solution treatment of 500° C., 24 hours. The heat-treated spacer was subjected to the same corrosion test as in Example III, as a result, white corrosion did not occur, and a high corrosion resistance was exhibited.

Figure 13:
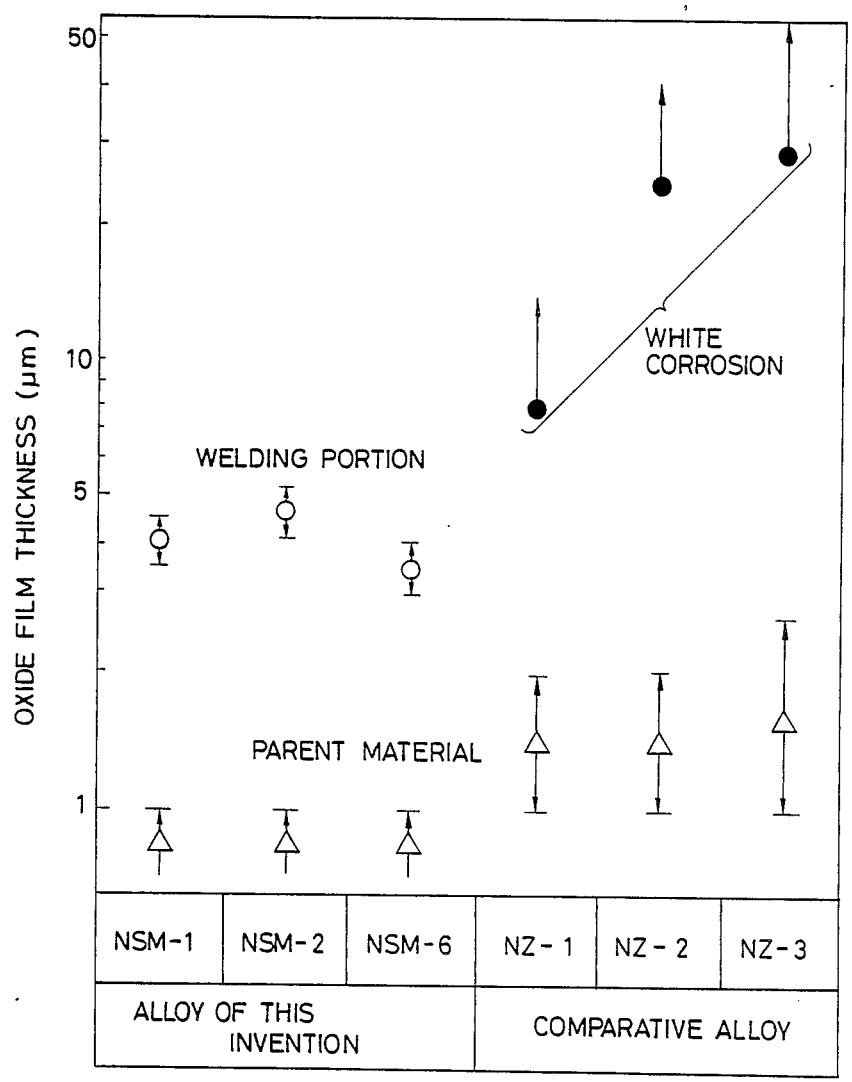
FIG. 13 is a diagram showing oxide film thickness in various alloys.

In FIG. 13, the thickness of the alloys of the present invention and comparative alloys are shown at welded portions and parent material portion, wherein O and Δ show black uniform oxidation and ●, white corrosion (frail).

The alloys of the present invention can be used for fuel claddings when welding is adapted.

We claim:

1. A nuclear reactor fuel assembly comprising a channel box, a plurality of fuel rods each disposed in said channel box and having a cladding and fuel pellets inserted therein, and a plurality of spacers each arranged in a longitudinal direction of said fuel rods and spacing said fuel rods in said channel box, at least one of said channel box and said each spacer being of welded construction, characterized in that said at least one, of welded construction, of said channel box and said each spacer is constructed of a Zr-Nb-Sn alloy comprising 0.5–2.2 wt % Nb, 0.5–2.0 wt % Sn, said Nb and Sn contained so as to satisfy the relation of Sn(wt %)≧2×Nb(wt %)-3.0, and balance Zr, and a welded portion and a heat affected zone have an equilibrium phase structure of more than 85% by area ratio, and an unwelded portion has an equilibrium phase structure.

2. A nuclear reactor fuel assembly comprising a channel box, a plurality of fuel rods each disposed in said channel box and having a cladding and fuel pellets inserted therein, and a plurality of spacers each arranged in a longitudinal direction of said fuel rods and spacing said fuel rods in said channel box, at least one of said channel box and said each spacer being of welded construction, characterized in that said at least one, of welded construction, of said channel box and said each spacer is constructed of a Zr-Nb-Sn alloy comprising 0.5–2.2 wt % Nb, 0.5–2.0 wt % Sn, said Nb and Sn contained so as to satisfy the relation of Sn(wt %)≧2×Nb(wt %) 3.0, and balance Zr, and a welded portion and a heat affected zone have an equilibrium phase structure of more than 85% by area ratio, and an unwelded portion has an equilibrium phase structure.

3. A nuclear reactor fuel assembly according to claim 1, wherein said welded portion and said heat affected zone has the structure of more than 85% by area ratio of an equilibrium phase, and a residual of said welded portion and said heat effected zone has a structure of a needle-shaped nonequilibrium phase.

4. A nuclear reactor fuel assembly comprising a channel box, a plurality of fuel rods each disposed in said channel box and having a cladding and fuel pellets inserted therein, and a plurality of spacers each arranged in a longitudinal direction of said fuel rods and spacing said fuel rods in said channel box, at least one of said channel box and said each spacer being of welded construction, characterized in that said at least one, of welded construction, of said channel box and said each spacer is constructed of a Zr-Nb-Sn alloy comprising 0.5 2.2 wt % Nb, 0.5–2.0 wt % Sn, said Nb and Sn contained so as to satisfy the relation of Sn(wt %)≧2×Nb(wt %)-3.0, and balance Zr, and a welded portion and a heat affected zone have the whole equilibrium phase structure or a mixed phase structure of more than 85% of an equilibrium phase and the residual of a needle-shaped nonequilibrium phase, and an unwelded portion has a recrystallized structure of a granular equilibrium phase.

5. A nuclear reactor fuel assembly according to claim 4, wherein said welded portion, said heat affected zone and unwelded portion have been subjected to solution treatment, whereby said welded portion and said heat affected zone have the whole equilibrium phase structure or a mixed phase structure of more than 85% of an equilibrium phase and the residual of a needle-shaped nonequilibrium phase, and said unwelded portion has a recrystallized structure of a granular equilibrium phase.

6. A nuclear reactor fuel assembly comprising a channel box, a plurality of fuel rods each disposed in said channel box and having a cladding and fuel pellets inserted therein, and a plurality of spacers each arranged in a longitudinal direction of said fuel rods and spacing said fuel rods in said channel box, at least one of said channel box and said each spacer being of welded construction, characterized in that said at least one, of welded construction, of said channel box and said each spacer is constructed of a Zr-Nb-Sn-Mo alloy comprising 0.5–2.2 wt % Nb, 0.5–2.0 wt % Sn, said Nb and Sn contained so as to satisfy the relation of Sn(wt %)≧2×Nb(wt %)-3.0, 0.1–0.8 wt % Mo, and balance Zr, and a welded portion and a heat affected zone have an equilibrium phase structure of more than 85% by area ratio, and an unwelded portion has an equilibrium phase structure.

7. A nuclear reactor fuel assembly according to claim 6, wherein said Zr-Nb-Sn-Mo alloy comprising 0.5–2.2 wt % Nb, 0.5–1.5 wt % Sn, 0.1–0.8 Mo, said Nb and said Sn being contained so as to satisfy the relation of Sn(wt %)≧2×Nb(wt %)-3.0 and said Nb and said Mo being contained so as to satisfy the relation of Nb(wt %)+Mo(wt %)≧1.5 wt %, and balance Zr.

8. A nuclear reactor fuel assembly comprising a channel box, a plurality of fuel rods each disposed in said channel box and having a cladding and fuel pellets inserted therein, and a plurality of spacers each arranged in a longitudinal direction of said fuel rods and spacing said fuel rods in said channel box, at least one of said channel box and said each spacer being of welded construction, characterized in that said at least one, of welded construction, of said channel box and said each spacer is constructed of a Zr-Nb-Sn-Mo alloy comprising 0.5–2.2 wt % Nb, 0.5–2.0 wt % Sn, 0.1–0.8 wt % Mo, said Nb and Sn contained so as to satisfy the relation of Sn(wt %)≧2×Nb(wt %)-3.0, and said Nb and said Mo being contained so as to satisfy the relation of Nb(wt %)+Mo(wt %)≧1.5 wt %, and balance Zr, and a welded portion and a heat affected zone have an equilibrium phase structure of more than 85% by area ratio, and an unwelded portion has an equilibrium phase structure.

9. A nuclear reactor fuel assembly according to claim 7, wherein said welded portion and said heat affected zone have the structure comprising more than 85% by area ratio of an equilibrium phase and a residual of said welded portion and said heat affected zone has a structure of a needle-shaped nonequilibrium phase.

10. A nuclear reactor fuel assembly comprising a channel box, a plurality of fuel rods each disposed in said channel box and having a cladding and fuel pellets inserted therein, and a plurality of spacers each arranged in a longitudinal direction of said fuel rods and spacing said fuel rods in said channel box, at least one of said channel box and said each spacer being of welded construction, characterized in that said at least one, of welded construction, of said channel box and said each spacer is constructed of a Zr-Nb-Sn-Mo alloy comprising 0.5–2.2 wt % Nb, 0.5–2.0 wt % Sn, 0.1–0.8 Mo, said Nb and said Sn being contained so as to satisfy the relation of Sn(wt %)≧2×Nb(wt %)-3.0 and said Nb and said Mo being contained so as to satisfy the relation of Nb(wt %)+Mo(wt %)≧1.5 wt %, and balance Zr, and a welded portion and a heat affected zone have the whole equilibrium phase structure or a mixed phase structure of more than 85% of an equilibrium phase and the residual of a needle-shaped nonequilibrium phase, and an unwelded portion has a recrystallized structure of a granular equilibrium phase.

11. A nuclear reactor fuel assembly according to claim 10, wherein said welded portion, said heat affected zone and unwelded portion have been subjected to solution treatment, whereby said welded portion and said heat affected zone have the whole equilibrium phase structure or a mixed phase structure of more than 85% of an equilibrium phase and the residual of a needle-shaped nonequilibrium phase, and said unwelded portion has a recrystallized structure of a granular equilibrium phase.

12. A nuclear reactor fuel assembly according to claim 1, wherein the amount of Sn is 0.5–1.5 wt %.

13. A nuclear reactor fuel assembly according to claim 2, wherein the amount of Sn is 0.5–1.5 wt %.

14. A nuclear reactor fuel assembly according to claim 4, wherein the amount of Sn is 0.5–1.5 wt %.

15. A nuclear reactor fuel assembly according to claim 6, wherein the amount of Sn is 0.5–1.5 wt %.

16. A nuclear reactor fuel assembly according to claim 8, wherein the amount of Sn is 0.5–1.5 wt %.

17. A nuclear reactor fuel assembly according to claim 10, wherein the amount of Sn is 0.5–1.5 wt %.

18. A nuclear reactor fuel assembly according to claim 4, wherein said welded portion, said heat affected zone and said unwelded portion have been subjected to aging heat treatment after the welding.

19. A nuclear reactor fuel assembly according to claim 18, wherein said aging heat treatment is carried out at a temperature less than 610° C.

20. A nuclear reactor fuel assembly according to claim 10, wherein said welded portion, said heat affected zone and said unwelded portion have been subjected to aging heat treatment after the welding.

21. A nuclear reactor fuel assembly according to claim 20, wherein said aging heat treatment is carried out at a temperature less than 610° C.

22. A nuclear reactor fuel assembly according to claim 5, wherein said solution treatment includes maintaining the alloy for at least 2 seconds in a temperature range of 680° to 780° C., and cooling continuously from a temperature range of α+β phase, the cooling rate being controlled to be less than 50° C./second in said temperature range of 680° to 780° C.

23. A nuclear reactor fuel assembly according to claim 11, wherein said solution treatment includes maintaining the alloy for at least 2 seconds in a temperature range of 680° to 780° C., and cooling continuously from a temperature range of α+βphase, the cooling rate being controlled to be less than 50° C./second in said temperature range of 680° to 780° C.

24. A nuclear reactor fuel assembly according to claim 1, wherein the Zr-Nb-Sn alloy consists essentially of the Zr, the Nb and the Sn.

25. A nuclear reactor fuel assembly according to claim 4, wherein the Zr-Nb-Sn alloy consists essentially of the Zr, the Nb and the Sn.

26. A nuclear reactor fuel assembly according to claim 6, wherein the Zr-Nb-Sn-Mo alloy consists essentially of the Zr, the Nb, the Sn and the Mo.

27. A nuclear reactor fuel assembly according to claim 8, wherein the Zr-Nb-Sn-Mo alloy consists essentially of the Zr, the Nb, the Sn and the Mo.

* * * * *